(12) United States Patent
Josafatsson

(10) Patent No.: US 10,925,267 B2
(45) Date of Patent: Feb. 23, 2021

(54) AIRFOIL SHAPED TRAWL DOOR

(71) Applicant: NY TOGHLERAHONNUN EHF., Reykjavik (IS)

(72) Inventor: Smari Josafatsson, Mosfellsbaer (IS)

(73) Assignee: NY TOGHLERAHONNUN EHF., Reykjavik (IS)

( * ) Notice: Subject to any disclaimer, the term of this patent is extended or adjusted under 35 U.S.C. 154(b) by 265 days.

(21) Appl. No.: 15/760,020

(22) PCT Filed: Sep. 14, 2016

(86) PCT No.: PCT/IS2016/050014
§ 371 (c)(1),
(2) Date: Mar. 14, 2018

(87) PCT Pub. No.: WO2017/046818
PCT Pub. Date: Mar. 23, 2017

(65) Prior Publication Data
US 2018/0228135 A1 Aug. 16, 2018

(30) Foreign Application Priority Data
Sep. 14, 2015 (IS) .......................................... 050119

(51) Int. Cl.
*A01K 73/045* (2006.01)
(52) U.S. Cl.
CPC ................. *A01K 73/045* (2013.01)
(58) Field of Classification Search
CPC ...... A01K 73/045; A01K 73/04; A01K 73/00; A01K 73/02; B63G 8/42; B63B 21/66
See application file for complete search history.

(56) References Cited

U.S. PATENT DOCUMENTS

| | | | | |
|---|---|---|---|---|
| 3,281,980 | A * | 11/1966 | Luketa | A01K 73/045 43/9.7 |
| 3,353,292 | A * | 11/1967 | Luketa | A01K 73/045 43/9.7 |
| 3,372,507 | A * | 3/1968 | Luketa | A01K 73/045 43/9.7 |
| 4,180,935 | A * | 1/1980 | Goudey | A01K 73/045 43/9.7 |
| 4,484,534 | A * | 11/1984 | Thillaye du Boullay | A01K 73/045 114/244 |
| 4,882,870 | A * | 11/1989 | Andreasen | A01K 73/045 43/9.1 |
| 2008/0307691 | A1* | 12/2008 | Guonason | A01K 73/045 43/9.7 |
| 2015/0138921 | A1* | 5/2015 | Skjold-Larsen | A01K 73/045 367/106 |

\* cited by examiner

*Primary Examiner* — Trinh T Nguyen
(74) *Attorney, Agent, or Firm* — Muncy, Geissler, Olds & Lowe, P.C.

(57) ABSTRACT

The present invention relates to trawl doors used in trawl fishing, including shallow water trawl fishing applications, deep water trawl fishing applications, bottom trawl fishing applications as well as at pelagic trawl fishing applications. The invention also relates to seismic surveillance line spreading and spreading of other items towed in water. The present application provides a novel trawl door design with improved stability and efficiency. The inventors are able to demonstrate smaller angles of attack using the trawl door of the present invention, which is as little as 7.5 degrees.

19 Claims, 9 Drawing Sheets

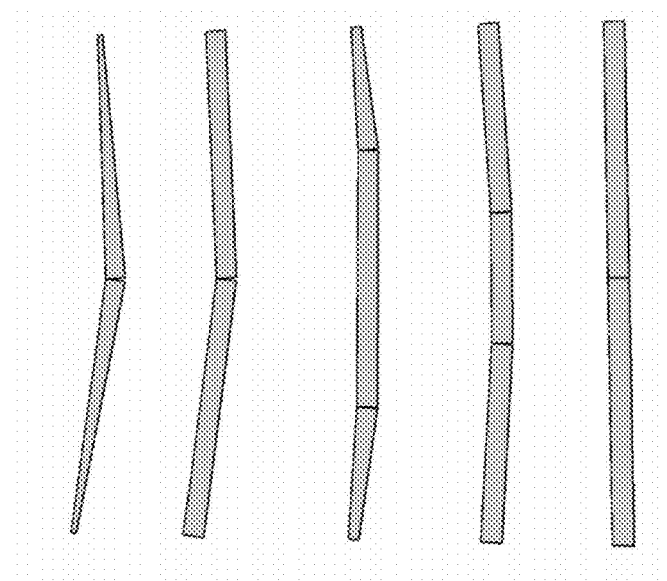
Fig. 7
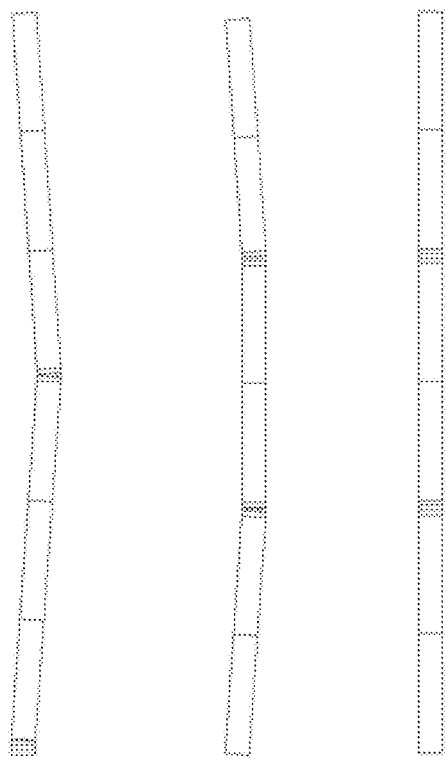
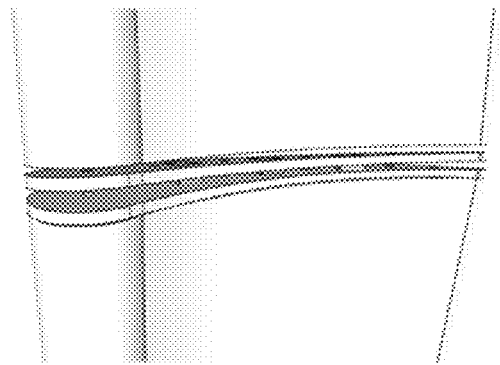
Fig. 8a                                       Fig. 8b

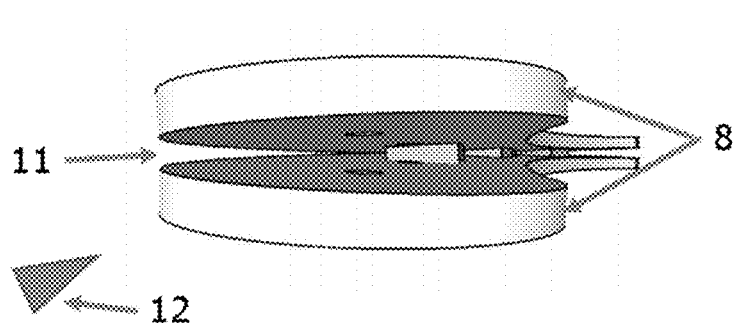
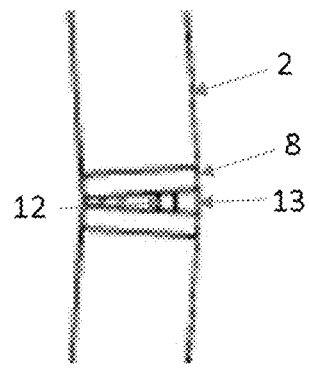
Fig. 8c            Fig. 8d
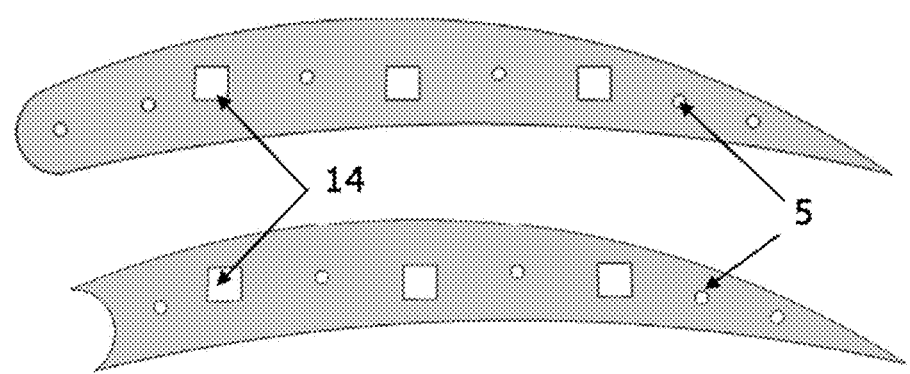
Fig. 9a
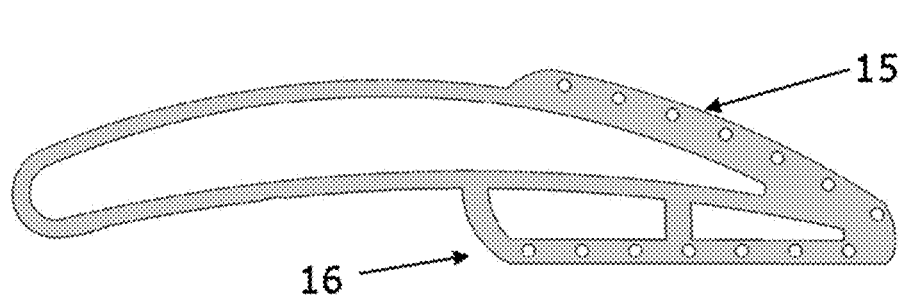
Fig. 9b

AIRFOIL SHAPED TRAWL DOOR

FIELD

The present invention relates to trawl doors used in trawl fishing, including shallow water trawl fishing applications, deep water trawl fishing applications, bottom trawl fishing applications as well as at pelagic trawl fishing applications. The invention also relates to seismic surveillance line spreading and spreading of other items towed in water.

INTRODUCTION

Due to the constantly increasing costs of operating commercial trawlers, it is important to improve the efficiency of the fishing equipment so as to minimize drag and fuel consumption requirements. A common problem of using convention trawl doors to spread the mouth of a trawl net open is the lack of efficiency. Traditional doors nowadays fish at about 20-40 degree angle of attack. There is a need to provide for more efficient trawl doors, especially those exhibit better spread of a trawl net during actual trawling operations as well as reduced drag.

Furthermore, with traditional trawl doors vortices are formed behind the trawl door which push the doors towards each other. During operation the door must be constantly forced out to increase the space between the doors, which requires additional energy and hence oil consumption. The vortices make traditional doors unstable and wobbly. Thus, there is need in the industry for trawl doors that are more efficient and stable than known trawl doors.

CN103340186 discloses a double-cambered-surface trawl otter board. The main panel is a vertical double-cambered-surface structure with a cross section in a double-circular-arc shape and hollow inside. The inner space is separated into four watertight spaces with a guide plate on the front side of the main panel and a pressure proof valve is in each watertight space on the rear side.

U.S. Pat. No. 4,180,935 discloses a trawl door formed from a single main deflector body having a relatively thick profile width and a range of profile shapes similar to an airfoil shape. The shape is disclosed such that the profile of the main deflector has an outer side that is convex and an inner side that is both convex as well as. The profile for the main deflector and/or trawl door preferably does not have a purely concave inner surface. Additionally, it is disclosed that the shapes for a preferred profile of a trawl door are most superior, and makes no use of additional lift enhancing structures, thus the main deflector comprises the entire lift generating structure of the trawl doors taught in this patent. However, the design shown in this patent pertaining to the shape of trawl doors cannot be found in the industry.

SUMMARY

It is an object of the present invention to overcome and/or ameliorate the aforementioned drawbacks of the prior art and to provide a new and improved and/or alternative and/or additional trawl door increased fishing capacity and reduced energy consumption for fishing vessels. It is one preferred object of the present invention to provide a hollow trawl door having a airfoil cross-section comprising side panels having a curvature forming the back and front surface and being connected at a leading edge and at a trailing edge of the trawl door and where an upper panel and a bottom panel form the top and the bottom sides to form a hollow trawl door. Moreover, it is a preferred object of the present invention to provide trawl door one or more inlets in the panels to allow water to fill the chamber between the panels of the trawl door. The trawl door according to the present invention has reinforcement bars and pipes as well as profiles along the length of the trawl door to increase the strength of the door.

The present application provides a novel trawl door design with improved stability and efficiency. The inventors are able to demonstrate smaller angles of attack using the trawl door of the present invention, which is as little as 7.5 degrees. This is partly due to the design of the trawl door having an airfoil cross section shape and additionally the front-straps. In contrast, traditional designs are always operated fully stalled which results in very high unnecessary drag. Traditional doors nowadays do not operate with such a small angle of attack due to the shape of the doors. They are primarily forcing doors, and consume a large amount of oil during towing. Traditional trawl doors have a forced angle of fishing with much effort angle (about 20-40 degrees) with connections of the towing wire in the bracket and with connections from back-straps to the trawl. On the other hand, due to the new form, the inventors only observed very small vortices are formed behind the door, which provides higher stability and decrease the energy consumption required to maintain the positions of the doors.

The present invention provides a new trawl door design which also provides a new way to assemble such a trawl door, where all sides of the plates forming the surface of the trawl doors have rectangular corners. Where the trawl doors do not have a planar shape, such as V-shape, U-shape, dihedral, tip dihedral or polyhedral shape, wedges or picks are used to facilitate different angles. This makes the production and the building of the trawl door much easier and results in a better product. The shape of the door facilitates a fishing device with better fishing capacity and fishing efficiency in that it is possible the tow the doors at a smaller angle than with traditional door, which results in decreased fuel consumption by the fishing vessel, In addition to the above, the new trawl door design provides a trawl door which behaves in a more stable manner during towing in the ocean, which means that the trawl door makes less noise and/or disturbance in the ocean and is therefore less likely to scare away the fish during towing.

The object(s) underlying the present invention is (are) particularly solved by the features defined in the independent claims. The dependent claims relate to preferred embodiments of the present invention. Further additional and/or alternative embodiments are discussed below.

Thus, at least one of the preferred objects of the present invention is solved by a hollow trawl door having one or more chambers and an airfoil cross-section. The trawl door comprises a first side panel having a curvature forming the back surface, a second side panel having a curvature forming the front surface, and an upper panel forming the top of the trawl door and a bottom panel forming the bottom of the trawl door. Furthermore, the first side panel and second side panel are connected at a leading edge and at a trailing edge of the airfoil the trawl door comprises one or more openings to allow water to flow in and out of the trawl door.

In preferred embodiments the hollow trawl door has a) a reinforcing pipe along the leading edge of the airfoil, b) a reinforcing bar along the trailing edge of the airfoil, and profiles extending through each of the one or more chambers from the upper panel to the lower panel to increase the strength of the hollow trawl door.

In preferred embodiments the hollow trawl door further comprising bands, having the same shape as the upper and lower panel, for reinforcing the hollow trawl door and to divide the hollow trawl door into more than one chambers.

In preferred embodiments the hollow trawl door has a keel and/or trawl door shoe having the same shape as the fishing form of the trawl door, wherein the plates forming the keel and/or trawl door shoe have the same shape as the plates forming the upper and lower panel. This gives the trawl door a uniform shape, such that both the keel and the shoe are formed in the fishing form or fishing capacity of the trawl door.

In the present context the term "water" relates to clear water or sea water (the ocean) as most trawling takes place in the ocean/sea.

In the present context the terms "fishing form", "fishing capacity" or "fishing efficiency" of the trawl door relates to the function of the trawl door as a result of its shape.

In the present context the terms "upper panel", "lower panel", "band" and "keel plate" refer to a plate having the same shape as the cross-sectional airfoil shape of the trawl door and having the purpose of being building components for the door by being the top or bottom panel of the door or bands dividing the door into more than one chamber or forming the keel or trawl door shoe for the new trawl door design.

In an embodiment of the present invention, the radius of the second side panel which is about at least about 1 to about 5, preferably about 2 to about 3, times of the radius of the first side panel.

In an embodiment of the present invention, the second side panel or front surface further comprises one or more front-straps near the trailing edge.

Preferably, the trawl door has openings at or near the top and the bottom of the trawl door to allow water to flow in and out of the trawl door.

In an embodiment of the present invention, the trawl door may further comprise one or more pipes at the leading edge of the airfoil.

In an embodiment of the present invention, the length of the chord line is substantially the same as the radius of the first side panel.

In an embodiment of the present invention, the trawl door further comprises an end member to strengthen the joining of the first and second side panels at the trailing edge of the airfoil.

In an embodiment of the present invention, the trawl door may have a V-shape, U-shape, dihedral, tip dihedral or polyhedral shape along its length.

In an embodiment of the present invention, the trawl door further comprises a keel, said keel comprising plates or bands in the same shape as the cross-section of the hollow trawl door.

In an embodiment of the present invention, the trawl door further comprises a trawl door shoe, said trawl door shoe comprising plates or bands in the same shape as the cross-section of the hollow trawl door.

In an embodiment of the present invention, the first or second side panel is formed by joining two or more horizontal plates. The horizontal plates may be joined at an angle of about 170° to about 180°. Preferably, the first or second side panel is formed by joining three horizontal plates where each joint has an angle of about 175° to about 180.

In an embodiment of the present invention, the horizontal plates comprises one or more bands between the plates.

In an embodiment of the present invention, the ratio of the chord line of the airfoil to the longitudinal length is preferably about 0.5 to about 3.

In an embodiment of the present invention, the back surface or first side panel further comprises one or more back-straps near the trailing edge.

In an embodiment of the present invention, the second side panel or front surface further comprises one or more front-straps near the trailing edge.

In an embodiment of the present invention, the leading edge has trawl door further comprises a front member extending along the leading edge.

Preferably, the trawl door further comprises the trawl door further comprises a bracket at the front side panel and optionally a bracket stopper.

In an embodiment of the present invention, the trawl door can comprise a flap member at the front surface near the trailing edge of the airfoil.

In an embodiment of the present invention, the trawl door further comprise one or more spoilers.

In an embodiment of the present invention, the trawl door has a location sensor, trawl door sensor, monitor sensor or a trawl door monitor sensor and holders for such sensors. The sensor(s) identify or determine the location of the trawl door in the water. In the present context the sensor holders are placed partly inside the chambers. So they are better protected than on traditional trawl doors where the sensor holders are on the front or partly on front and back of the trawl doors unprotected. This way the sensor holders are not affecting the fishing ability of the trawl doors as they are mostly or partly inside the chambers.

In an embodiment of the present invention, the length of the chord line is substantially the same as the radius of the first side panel.

BRIEF DESCRIPTION OF THE FIGURES

FIG. 7 shows different constructions of the trawl doors of the present invention.

FIG. 8a-8d shows different constructions of the trawl doors of the present invention.

FIG. 9a-9b show a band or bands which can be included between the panels or compartments.

DESCRIPTION

Figure 1:
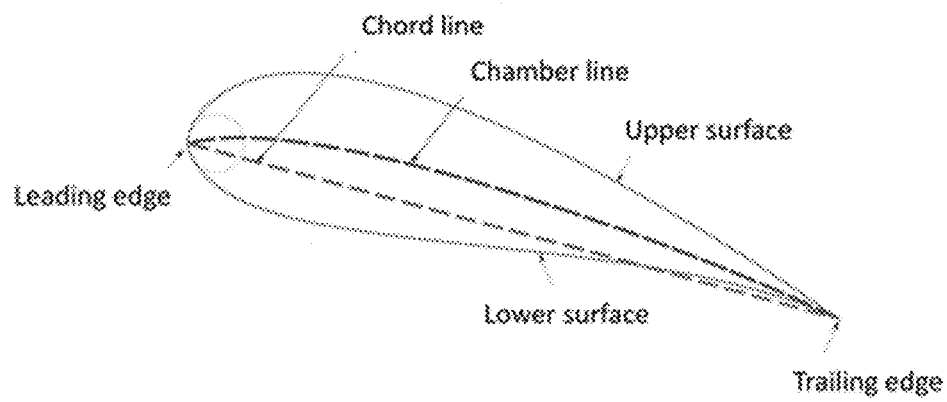
FIG. 1 illustrates an airfoil.

The present invention provides a trawl door having an airfoil cross-section. FIG. 1 shows classical terminology for the airfoil shape. The airfoil shape has an upper surface and a lower surface joined at a leading edge having a maximum curvature and a relatively sharp trailing edge with a minimum curvature. The chord line is the straight line connecting leading and trailing edges. The camber line (6) is the locus of points midway between the upper and lower surfaces. As the use of the airfoil shape in the present invention is in water and the orientation is different from uses such as airplane wings, the upper surface is referred to as the back surface and the lower surface is referred to as the front surface.

Figure 2:
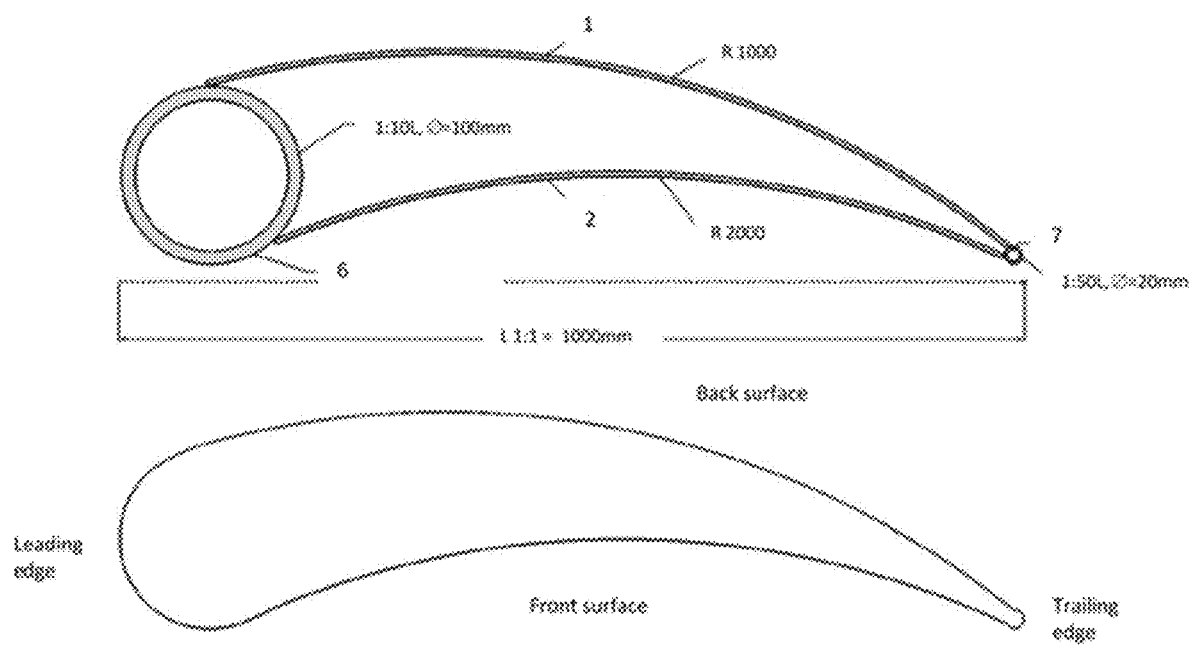
FIG. 2 shows the cross section of a preferred embodiment of the trawl door.

In contrast to conventional trawl doors, which do not have chambers inside, the present trawl doors is hollow, i.e. having one or more chamber having cross section of an airfoil shape. Preferably, the radius of the second side panel is greater (higher number) than that of the first side panel. In operation, such shape allows the water to push the door to spread out constantly and slowly. FIG. 2 shows a transection drawing of a trawl door with an example of dimensions and ratios.

The trawl door comprises a first side panel 1 having a curvature forming the back surface, a second side panel 2 having a curvature forming the front surface, where the first side panel and second side panel are connected at a leading edge and at a trailing edge of the airfoil, and an upper panel 3 forming the top of the trawl door and a bottom panel 4 forming the bottom of the trawl door.

As the trawl door is hollow it is also non-watertight. The fact that chamber is filled with water prevents the door to collapse under pressure in deeper water and stabilizes the door during fishing. This also stabilizes the trawl door during operation. Therefor the trawl door has one or more openings 5 or inlets which allow water to fill the chambers of the trawl door. The openings are preferably at or near the top and the bottom of the trawl door, but could also be located elsewhere. Preferably, the openings 5 are in the upper and lower panel and in the bands forming the compartments in the trawl door to allow water to flow in and out of the trawl door, as well as between the compartments.

Shape and Strength

Figure 3:
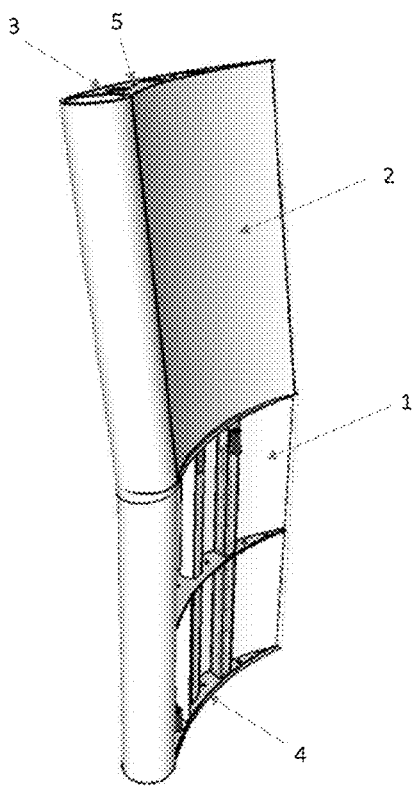
FIG. 3 shows an embodiment of the hollow trawl door of the invention.

The shape of the new trawl door is FIGS. 3-6. FIG. 3 is a schematic drawing of the trawl door of the present invention having a V-shape. The upper part shows the front side as closed, but in the lower part the panel has been removed to show inside the trawl door. The inside of the first panel 1 forming the back surface of the trawl door is shown in the lower part of the drawing as well as the second panel 2 forming the front surface of the trawl door. The an upper panel 3 forming the top of the trawl door and a bottom panel 4 forming the bottom of the trawl door are also shown in the drawing. Opening 5 for allowing water to enter and leave the hollow trawl door are shown in the upper 3 and lower panel.

Preferably, the radius of the second side panel is at least about 1 to about 5, such as about 1, about 2, about 3, about 4, or about 5 times bigger (higher number) than the radius of the first side panel. Most preferably, the radius is about 2 to about 3, times of the radius of the first side panel. The inventor of the present invention have discovered that when the radius of the second side panel is about 2 times of that of the first side panel, preferred angle of attack can be observed. As an example a trawl door having the height of 2500 mm and the width of 1000 mm, the pipe may be 10% of the width (or 100 mm). For such a trawl door the radius of the outer plate could be 1000 mm, whereas the radius of inner plate would be 2000 mm.

The water flows faster along the back surface as the radius is sharper (smaller number) compared to the lower surface with larger radius. This generates energy that seeks to spread the trawl doors to and thus achieving bigger trawl opening. Therefore the new trawl door design seeks to pull to the doors to spread more and thus achieving bigger trawl opening.

Figure 4:
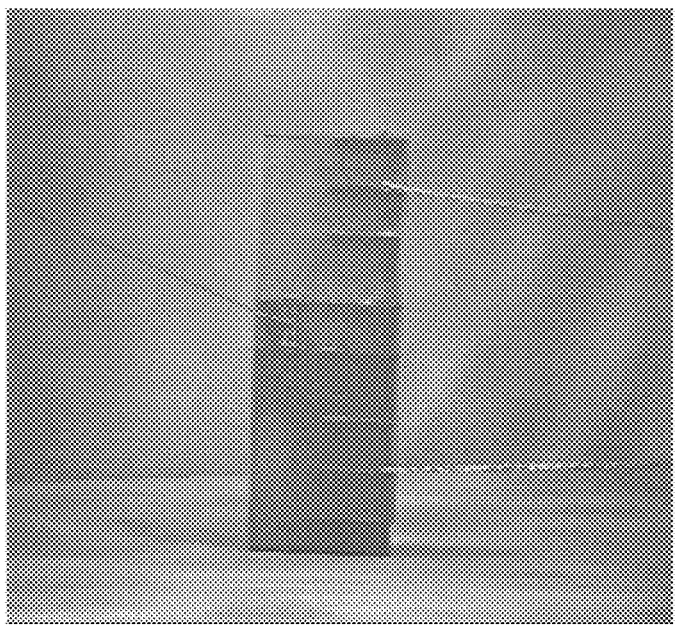
FIG. 4 shows a miniature model trawl door in operation in a flume tank.
Figure 5:
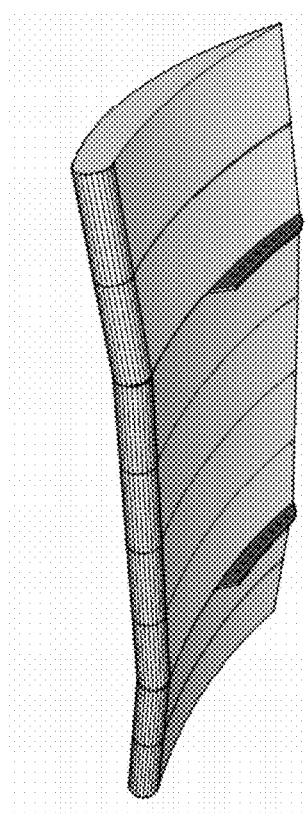
FIG. 5 shows two front-strap ears near the trailing edge of the trawl door.
Figure 6:
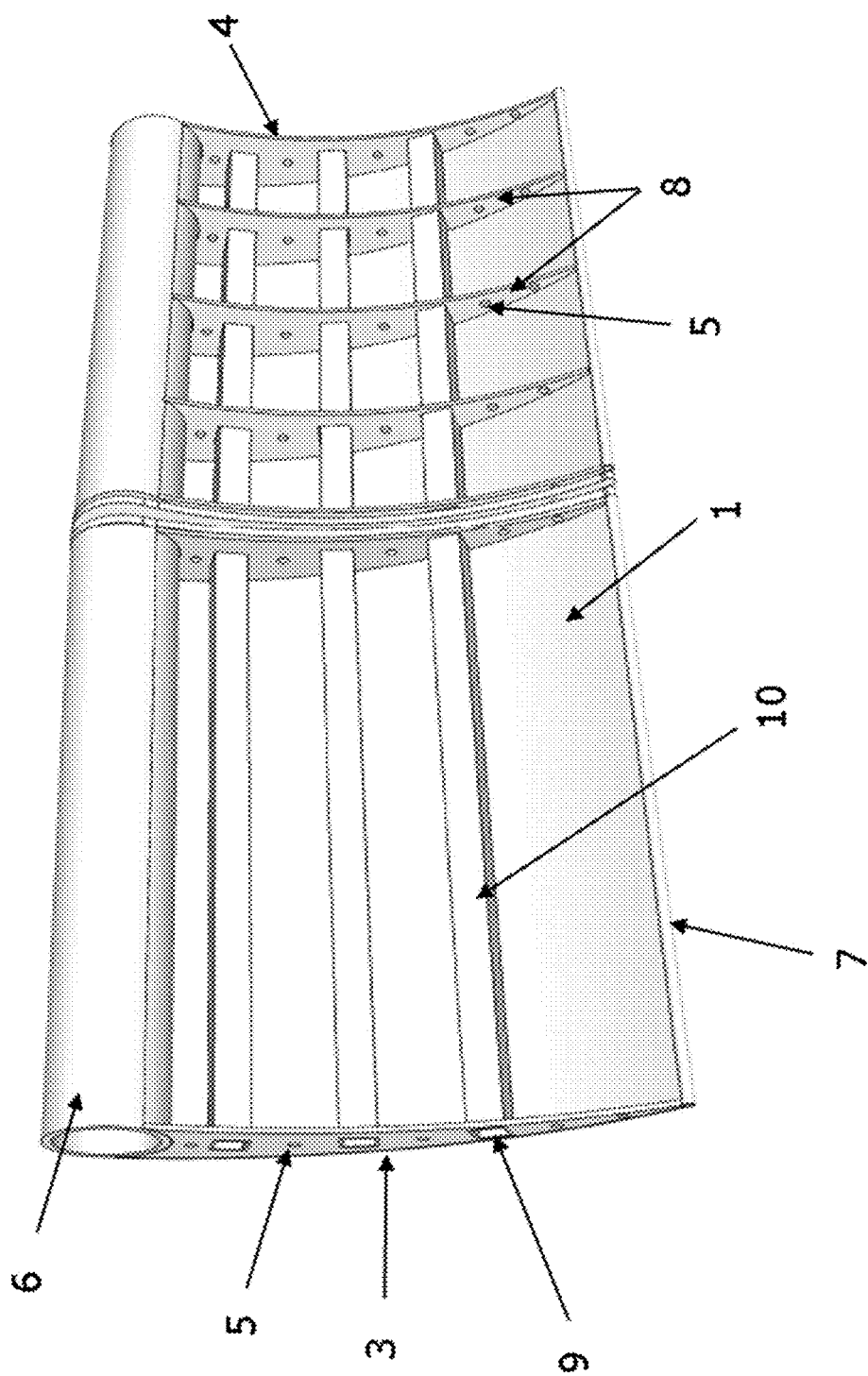
FIG. 6 shows the inside of the new hollow trawl door design.

FIG. 4 is a photograph of a trawl door according to the present invention in operation in a flume tank, where connections from the vessel are to the bracket and from front-strops ears to the trawl. FIG. 5 is a perspective drawing of a tip dihedral trawl door according to the present invention. FIG. 6 shows a perspective drawing of a trawl door according to the present invention where the second panel (lower side) is removed to show inside the trawl door. The figure shows the pipe 6 at the leading edge of the trawl door and a reinforcement pipe 7 at the trailing edge of the door. The back surface or first panel 1. The upper 3 and lower 4 panels or the bands 8 are shown with openings 5 for water to penetrate and with square holes 9 for profiles or longitudinal strengthening members 10 to penetrate. The profiles or longitudinal strengthening members 9 make the assembly if the plate more easy and correct. The upper side of the trawl door is shown as one compartment with three profiles extending between the upper panel and the upper band of the two bands separating the upper and the lower part of the V-shaped trawl door. The lower side of the trawl door is shown as four compartments separated by three bands between the lower panel and the lower band of the two bands separating the upper and the lower part of the V-shaped trawl door. The trawl door according to the present inventions may have V-shape, U-shape, dihedral, tip dihedral, polyhedral shape or straight, such as illustrated in FIG. 7.

Preferably, the first or second side panel is formed by joining two or more horizontal plates, such as illustrated in FIG. 7. The horizontal plates are joined at an angle of about 170° to about 180°. In a particular embodiment, the first or second side panel is formed by joining three horizontal plates at an angle of about 175° to about 180, with bands inserted or welded between the plates or compartments such as illustrated in FIG. 8a. In cases where an angle is required, a gap between the bands is formed at the lower/front surface to form the angle in the trawl door when welded together as is shown in FIG. 8b. In FIG. 8c, this is shown from a different angle showing the bands 8 and the gap 11 between the bands. A pick or wedge 12 is placed and attached to the bands 8 and then the gap is closed with a plate. FIG. 8d shows the wedge in the gap and a plate 13 to close the gap.

The door is preferably made of steel, aluminium, or even plastic. Preferably, the doors formed by joining smaller units together. In one embodiment of the present invention, the lower part of the trawl doors is made of thicker steel plates to add balance and for more strength.

Preferably, the horizontal plates comprises one or more bands between the plates. For example, the trawl door according to the present invention, wherein the ratio of the chord line of the airfoil to the longitudinal length to is about 0.5 to about 3, such as about 1, about 1.5, about 2, about 2.5 or about 3

Bands

As indicated above the trawl door can be divided into sections for all shapes of trawl doors, where each section of the trawl door is separated by one or more bands preferably made of steel having the shape of the cross section of the trawl door. Furthermore, the top and bottom panels have the same shape as the bands, apart from the pipe diameter which is removed from the bands separating the door into chambers as shown in FIG. 9a. The thickness of the plates can therefore be smaller if the trawl door is constructed from an individual steel plates as conventional trawl doors. The steel bands may come with a plurality of holes in order to allow sea water to flow into each section when the trawl door is submerged in the water and flows out when the trawl doors are out of the water again after each haul. The water will flow in and out rather slowly so it does not affect the fishing ability of the trawl doors. Different from conventional doors, the present trawl doors are filled with water during operation. The openings 5 for water to flow through and apertures 14 for profiles and other inner components are formed in the bands, which make the construction of the trawl door much more easy and accurate. The bands additionally comprise protrusions which form the bracket not shown, back-strap ears 15 or front-strap ears 16. This has the advantage of simplifying the manufacture process and the construction of the door. In addition, the use of material is also more efficient. In FIG. 9b, a band is shown where the front- and the back-strop ears of the trawl door are a part of the band and formed as one piece. This makes the assembly easier and stronger. The band has the effect of maintaining the shape of the door and provide strength. The pipe tube at the leading edge of the door provides strength for the trawl door as well as the steel bands.

Pipe at Leading Edge

A trawl door according to the present invention may have a pipe at a leading edge of the airfoil. This is illustrated in FIG. 6. In one preferred embodiment the first and second side panels are joined with a thick steel pipe at the leading edge. More specifically, the pipe has a thick pipe wall to give it strength. Having a pipe at the front of the door advantageously provides strength for the trawl door, since it is the leading edge that hits the vessel when the trawl doors come up after each fishing haul. Each section also comprises steel tubes which adds to the strength and makes the assembly easier. Preferably, the pipe at the leading edge may be 10 percentage of the length of the board or 1:10, i.e. the outer circumference of the pipe may be 10 of the width of the trawl door. Therefore, a trawl door having a cord line of 1000 mm would have a pipe diameter of 100 mm. This is shown in FIG. 2. Pipes with larger diameter are preferred because it increases the strength of the door. The size of the pipe may be relatively large to the extent that it does not adversely affect the fishing capacity of the door since the trawl doors are typically not towed very fast. In general trawl doors are towed at up to 7 knots for certain pelagic fishing. If trawl doors were towed at 20 knots, then a large pipe may start to have negative effects on the activity of the trawl door. Preferably, the pipe tubes have small holes at the top and the bottom, as well as inside the chambers in order to allow sea water to flow in and out.

Front-Strap Ears

In a preferred embodiment, the second side panel has one or more front-strap ears 16, preferably near the trailing edge as shown in FIGS. 4 and 5. The trawl nets are connected to the front-strap ears of the trawl door using the "back" straps. The front-strap ears are located at the front surface of the airfoil, being on the inside of the door at the aft end instead of to back-strap ears in the traditional doors.

When connected to the front-trap ears, the new doors automatically spreads outwards constantly and slowly and thereby reaching a smaller working angle of attack.

Thus, in a preferred embodiments of the present invention the new trawl door design comprises front-strap ears.

Back-Strap Ears

Figure 10:
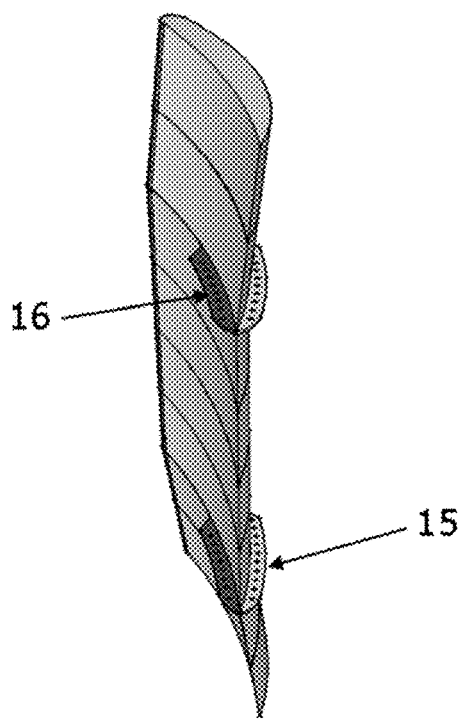
FIG. 10 shows a trawl door with front-straps and back-straps.

In a preferred embodiment, the first side panel has one or more back-strap ears 15 near the trailing edge. FIG. 10 shows a trawl door with both front-strap 15 ears and back-strap ears 15. Back-strap connection can be used for bottom fishing, shrimp fishing and pelagic fishing, whereas front-strap connection can be used for all the same fishing, as well as pelagic fishing high up in the water where a very large opening between the trawl doors is needed.

The new design provides a trawl door functions like a kite in that it does not require to be forced sideways by towing and connection to the trawl via the back-strap ears. It seeks sideways during towing at smaller angle and connection to the trawl via the front-strap ears. In the new trawl doors forced spread is not required.

Front Member

Figure 11A:
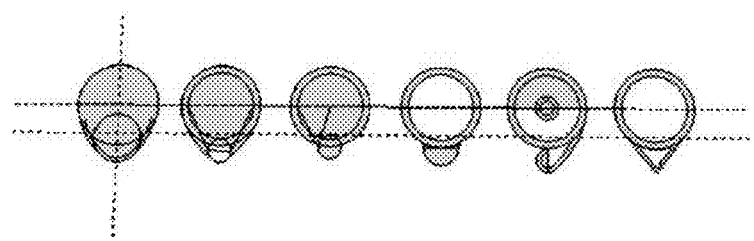
FIG. 11a-b show front members at the leading edge of the preferred trawl door.
Figure 11B:
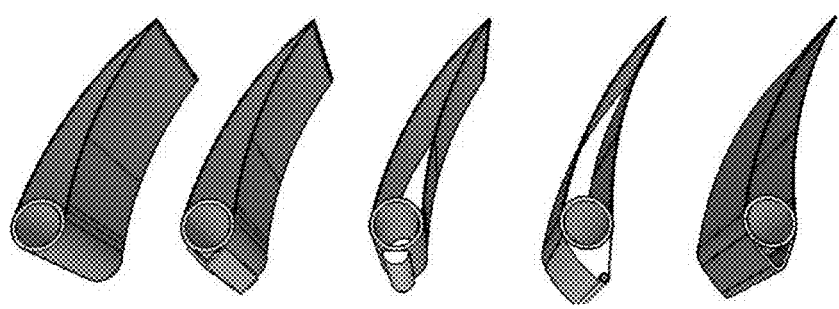

Additionally, the trawl door may have a front member extending along the leading edge of the door to cut the water during towing at higher speed. FIGS. 11a and 11b shows different embodiments of front members which can be added on the leading edge of the door.

Bracket and Bracket Stopper

In a preferred embodiment, the trawl door further comprises a bracket at the front surface. The towing warp wire is connected to the bracket 17 and the trawl is connected to the back-strap ears and/or front-strap ears.

Figure 12:
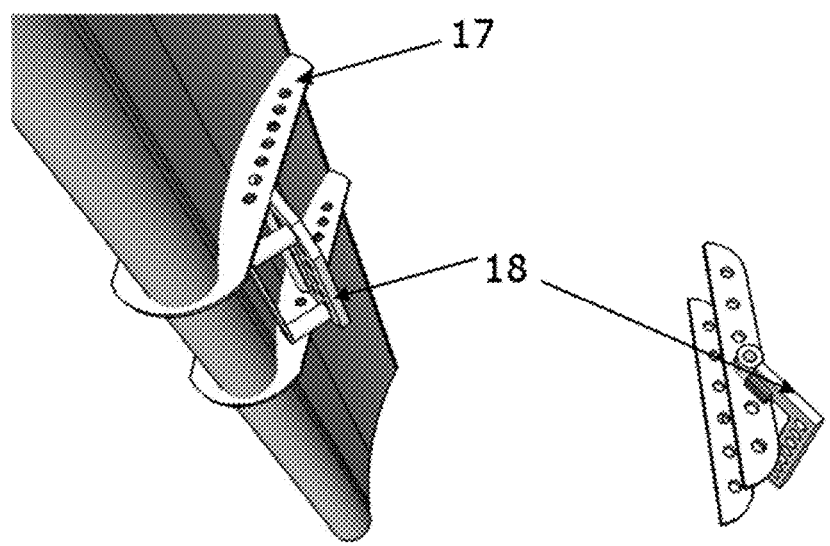
FIG. 12 shows a bracket and bracket stoppers.

FIG. 12 shows a bracket 17 and a bracket stopper 18 where the brackets are on hinges. The stopper 18 has the effect that it prevents the bracket to move beyond certain angle, such as less than 15 degrees. This can be useful when shooting the trawl doors when the front-strap connection is used.

Flap Member

Figure 13:
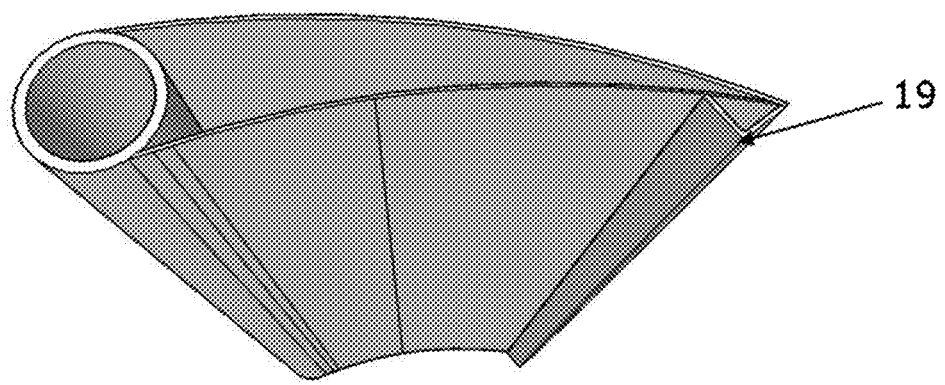
FIG. 13 shows a flap member located at the trailing edge of trawl door.

The trawl door according to the present inventions preferably further comprises a flap member 19 on the front side panel at the trailing edge of the airfoil. Such as shown in FIG. 13. This flap 19 may further strengthen the door as well as raise the maximum lift coefficient. When the water flows along the front side of the door, the flap 19 pushes the current outwards. In addition, this causes a change in the water stream flowing along the inside of the door to suddenly flow directly away from the door, thereby increasing the flow rate. Surprisingly, this leads to the forming of vortices further away from the trawl door, thus reducing the negative impact on the effectiveness of the trawl door as a result.

In a preferred embodiment, the flap member has a triangular cross-section. Such flap allows the trailing edge of the trawl doors to work more efficiently.

Spoiler

Figure 14A:
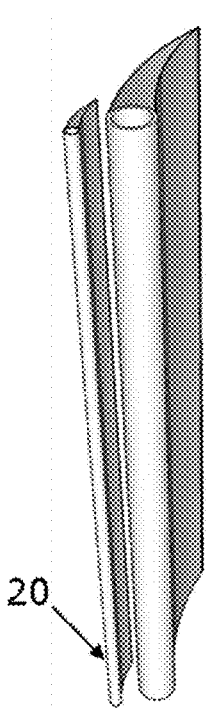
FIG. 14a-b show a trawl door with spoiler.
Figure 14B:
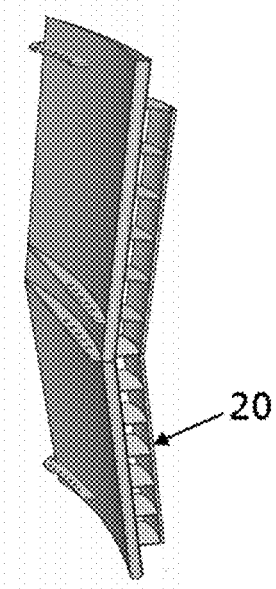

The trawl door according to the present inventions can further comprises one or more spoilers 20. Use of spoilers 20 are advantageous depending on the fishing methods and needs. Spoilers can be placed at or near the front part of the first side panel such as shown in FIG. 14a or 14b at or near the back of the first side panel, at or near the trailing edge of the second side panel.

Trawl Door Monitor Sensors

In a preferred embodiment, the trawl door further comprises a location sensor, trawl door sensor, monitoring sensor or trawl door monitoring sensor holders, such as for example a Scanmar or Simrad sensors and signal holders. The monitor sensor holders may be placed partly inside the trawl door chambers so they are better protected and will affect the fishing ability of the trawl doors less than when placed on the front of the main plate, through the main plate or the back of the main plate on traditional trawl doors.

Keel and Trawl Door Shoes

Figure 15A:
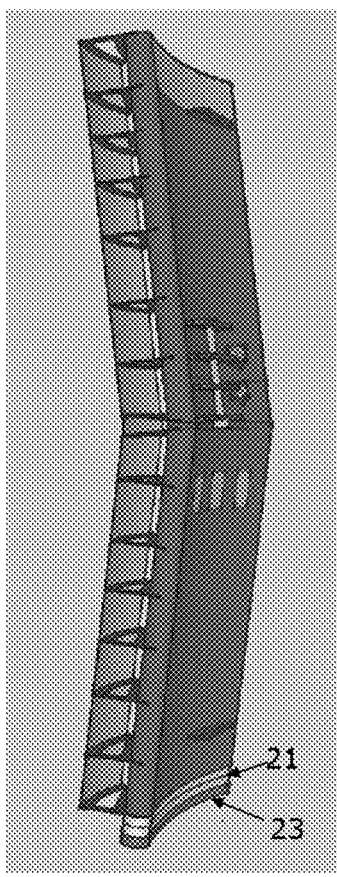
FIGS. 15a and b shows a drawl door with a keel and trawl door shoe.
Figure 15B:
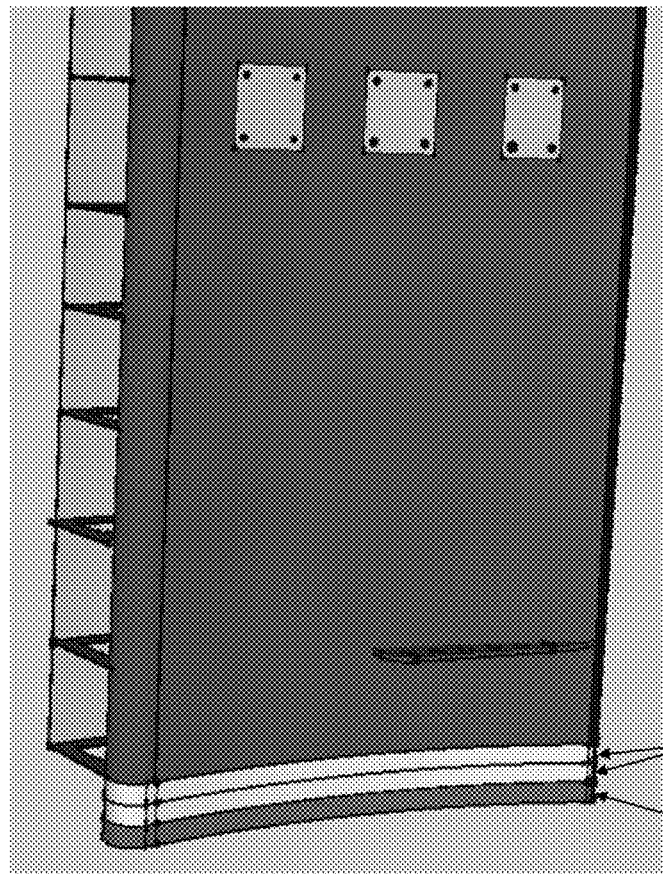

The trawl door of the invention may comprise a keel 21 made by adding plates 22 in the same shape as the upper and lower panel of the door. Furthermore, the trawl door may comprise a trawl door shoe 23 having the same shape as the upper and lower panel of the door and the keel. FIG. 15a shows a drawing of a trawl door according to the present invention with a keel 21 and a trawl door shoe 23. FIG. 15b is an enlarged part of the bottom portion of the door, where it is indicated that the keel is made by two keel plates 22. By having the keel and the show in the same shape as the cross sectional shape of the door, the fishing form or fishing capacity of the trawl door is not compromised.

Advantages

Figure 16:
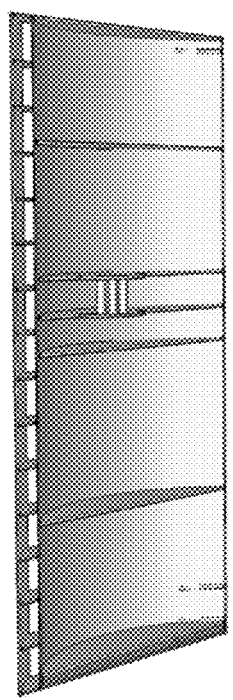
FIG. 16 illustrates a conventional trawl door.
Figure 17:
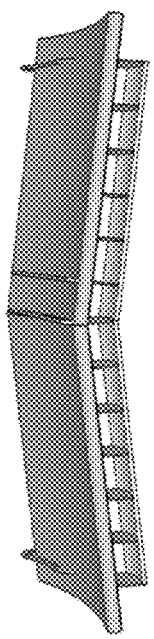
FIG. 17 shows a preferred embodiment having a V-shape.

It is not necessary to force the spread for the trawl doors of the present invention. Fishing with conventional trawl doors requires a 20 to 40 degrees angle of attack with connections to the brackets and to the back-strap ears. FIG. 16 shows a conventional trawl door which operates with a 37 degrees angle of attack. This big angle of attack takes on a lot of sea water and increases oil consumption. In contrast, the trawl door of the present invention, for example the one illustrated in FIG. 17, surprisingly works at as low as 7.5 degrees of angle of attack. Therefore, the new design allows trawling at much lower angle of attack which further reduces oil consumption.

As the new form allows a less forced spreading of the trawl doors, there is less resistance due to vortices and hence less energy consumption in stabilizing the trawl doors.

This novel form of trawl doors works equally well on the bottom of the ocean, just off the bottom in mid water or high up in the water. This has the advantage that bottom fishing does not require any touching or scraping of the bottom at all, making the trawl doors more environmentally friendly.

EXAMPLES

Examples of different shapes are shown in the drawings, but the following examples show how the new trawl door can be constructed. As the new trawl door can have a different shape along its length, such as a straight shape, a V-shape, U-shaped, dihedral, tip dihedral or polyhedral shape, the trawl door is made from plates, which are welded together. The new trawl door can also be assembled from compartments formed by the plates comprised in the side panels and optionally the upper and lower panels (for the end compartments).

Example 1

A Straight Trawl Door Design

A trawl door being 1000 mm wide×3000 mm high, or 3 square metre trawl door can be constructed as a single piece with bands on the inside to keep the shape and strength of the trawl door. The trawl door can also be constructed from two 1500 mm compartments, which are combined in the middle. A straight trawl door design can also be made from six 500 mm compartments being arranged together 500+500+500+500+500+500=3000 mm Example 2

A V-Shaped Trawl Door Design

The trawl door can be V-shaped (dihedral) constructed from two or more compartments.

A door being 1000 mm wide×3000 mm high, or 3 square metre trawl door can be constructed by combining two 1500 mm compartments or six 500 mm compartments put together three and three and then the trawl door is connected/welded in the middle forming an angle.

The trawl door can also be straight in the centre and V-shaped from the straight part at the top and bottom (tip dihedral).

A trawl door being 1000 mm wide×3000 mm high, or 3 square metre trawl door can be constructed by combining three compartments 1000 mm, but it could also be constructed in six 500 mm compartments where the 3×2 cells form the trawl door. The compartments can be made from plates with a 90° angle cutting and then V-shaped bands (wedge bands) with for example a total of 8 degree angle can be placed between the compartments to create the V-form shape.

The present invention covers further embodiments with any combination of features from different embodiments described above. Reference signs in the claims are provided merely as a clarifying example and shall not be construed as limiting the scope of the claims in any way. The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantial constant" shall also cover exactly constant). The terms "a", "an", "first", "second" etc do not preclude a plurality.

The invention claimed is:

1. A hollow trawl door, said hollow trawl door having one or more chambers and an airfoil cross-section, comprising:
 a first side panel having a curvature forming the back surface,
 a second side panel having a curvature forming the front surface, and
 an upper panel forming the top of the trawl door and a bottom panel forming the bottom of the trawl door,
 wherein the first side panel and second side panel are connected at a leading edge and at a trailing edge of the airfoil,
 wherein the trawl door comprises one or more openings to allow water to flow in and out of the trawl door; and
 wherein the radius of the second side panel is greater than 1 to about 5 times of the radius of the first side panel;

further comprising a reinforcing pipe along the leading edge of the airfoil and a reinforcing bar along the trailing edge of the airfoil to increase the strength of the hollow trawl door.

2. The hollow trawl door according to claim 1, wherein the one or more openings 5 are at or near the top and the bottom of the trawl door.

3. The hollow trawl door according to claim 1, wherein the reinforcing pipe has a diameter which is 10% of the width of the trawl door.

4. The hollow trawl door according to claim 1, further comprising profiles extending through each of the one or more chambers from the upper panel to the lower panel to increase the strength of the hollow trawl door.

5. The hollow trawl door according to claim 1, further comprising bands, having the same shape as the upper and lower panel, for reinforcing the hollow trawl door and to divide the hollow trawl door into more than one chambers.

6. The hollow trawl door according to claim 1, wherein the radius of the second side panel is about 2 to about 3 times of the radius of the first side panel.

7. The hollow trawl door according to claim 1, wherein the trawl door has a V-shape, U-shape, dihedral, tip dihedral or polyhedral shape along its length.

8. The hollow trawl door according to claim 1, wherein the trawl door further comprises a keel, said keel comprising plates or bands in the same shape as the cross-section of the hollow trawl door.

9. The hollow trawl door according to claim 1, wherein the trawl door further comprises a trawl door shoe, said trawl door shoe comprising plates or bands in the same shape as the cross-section of the hollow trawl door.

10. The hollow trawl door according to claim 1, wherein the ratio of the chord line of the airfoil to the longitudinal length to is about 0.5 to about 3.

11. The hollow trawl door according to claim 1, wherein the front surface further comprises one or more front-strap ears near the trailing edge.

12. The hollow trawl door according to claim 1, wherein the back surface further comprises one or more back-strap ears near the trailing edge.

13. The hollow trawl door according to claim 1, wherein the leading edge has a front member extending along the leading edge.

14. The hollow trawl door according to claim 1, wherein the trawl door further comprises a bracket at the front side panel and a bracket stopper.

15. The hollow trawl door according to claim 1, wherein the trawl door further comprises a flap member on the front side panel at the trailing edge of the airfoil.

16. The hollow trawl door according to claim 1, wherein the trawl door further comprises one or more spoilers.

17. The hollow trawl door according to claim 1, wherein the trawl door further comprises a location sensor.

18. The hollow trawl door according to claim 1, wherein the reinforcing pipe is hollow.

19. The hollow trawl door according to claim 1, wherein the leading edge has a transverse dimension larger than the transverse dimension of the trailing edge.

\* \* \* \* \*